(12) United States Patent
Han (10) Patent No.: US 7,020,495 B2
(45) Date of Patent: Mar. 28, 2006

(54) MOBILE COMMUNICATIONS TERMINAL WITH ROTATIONAL LCD DEVICE

(75) Inventor: Shin Han, Kyoungki-do (KR)

(73) Assignee: Curitel Communications, Inc., (KR)

( * ) Notice: Subject to any disclaimer, the term of this patent is extended or adjusted under 35 U.S.C. 154(b) by 382 days.

(21) Appl. No.: 10/185,120

(22) Filed: Jun. 27, 2002

(65) Prior Publication Data

US 2003/0114198 A1    Jun. 19, 2003

(30) Foreign Application Priority Data

Dec. 18, 2001  (KR) ............................. 2001-80677

(51) Int. Cl.
  *H04B 1/38* (2006.01)
(52) U.S. Cl. ............... 455/566; 455/90.3; 455/550.1; 455/575.1; 455/575.3; 345/649; 345/659; 345/30
(58) Field of Classification Search .......... 379/428.01, 379/428.03, 433.01, 433.04, 433.11, 433.12, 379/433.13; 455/40, 575, 566, 90.1, 90.2, 455/90.3, 550.1, 575.1, 575.3; 345/619, 345/649, 659, 30; 348/14.01
See application file for complete search history.

(56) References Cited

U.S. PATENT DOCUMENTS

| | | | | |
|---|---|---|---|---|
| 5,485,517 A | * | 1/1996 | Gray ...................... 379/433.13 |
| 5,708,561 A | * | 1/1998 | Huilgol et al. .............. 361/681 |
| 6,009,336 A | * | 12/1999 | Harris et al. ................ 455/566 |
| 6,370,362 B1 | * | 4/2002 | Hansen et al. ............. 455/90.1 |
| 6,415,165 B1 | | 7/2002 | Ishigami |
| 6,424,844 B1 | | 7/2002 | Lundqvist |
| 2001/0004269 A1 | | 6/2001 | Shibata et al. |
| 2002/0064036 A1 | | 5/2002 | Yano et al. |
| 2002/0094826 A1 | | 7/2002 | Lee |
| 2002/0102946 A1 | * | 8/2002 | SanGiovanni ................. 455/90 |
| 2003/0013417 A1 | * | 1/2003 | Bum ........................... 455/90 |
| 2003/0044000 A1 | * | 3/2003 | Kfoury et al. ......... 379/433.04 |
| 2004/0192398 A1 | * | 9/2004 | Zhu ........................... 455/566 |
| 2005/0113144 A1 | * | 5/2005 | Tupler et al. ............... 455/566 |

FOREIGN PATENT DOCUMENTS

| | | |
|---|---|---|
| EP | 1207671 A2 | 5/2002 |
| GB | 2351201 | 12/2000 |
| JP | 2001-156893 | 6/2001 |
| KR | 1020030000166 | 1/2003 |
| WO | WO 01/84729 A1 | 11/2001 |

* cited by examiner

*Primary Examiner*—Sonny Trinh
*Assistant Examiner*—Owen Frazier
(74) *Attorney, Agent, or Firm*—Blakely Sokoloff Taylor & Zafman (57) ABSTRACT

There is provided a mobile communications terminal having a rotational liquid crystal display (LCD) device. The LCD device includes an LCD accommodation case for accommodating an LCD therein, a folder body case for enabling the LCD accommodation case to be rotated in a predetermined angle, a shaft member for supporting the rotation of the LCD accommodation case on the folder body case, and a guide unit for guiding the rotation of the LCD accommodation case on the folder body case.

13 Claims, 13 Drawing Sheets

MOBILE COMMUNICATIONS TERMINAL WITH ROTATIONAL LCD DEVICE

FIELD OF THE INVENTION

The present invention relates to a mobile communication terminal; and, more particularly, to a mobile communications terminal employing a rotational liquid crystal display (LCD) device.

DESCRIPTION OF RELATED ARTS

As a mobile communications technology has substantially developed, portable mobile communications terminals (hereinafter, referred to as mobile terminal) are commonly used. Accompanying to this rapid development of mobile communications terminal markets, functions of mobile terminals have also improved significantly.

Especially, it is a trend in today to manufacture a miniaturized mobile terminal with improved functions.

In order to miniaturize the mobile terminal but still effectively showing moving pictures or data, it is required to employ a larger liquid crystal display (LCD).

Figure 1:
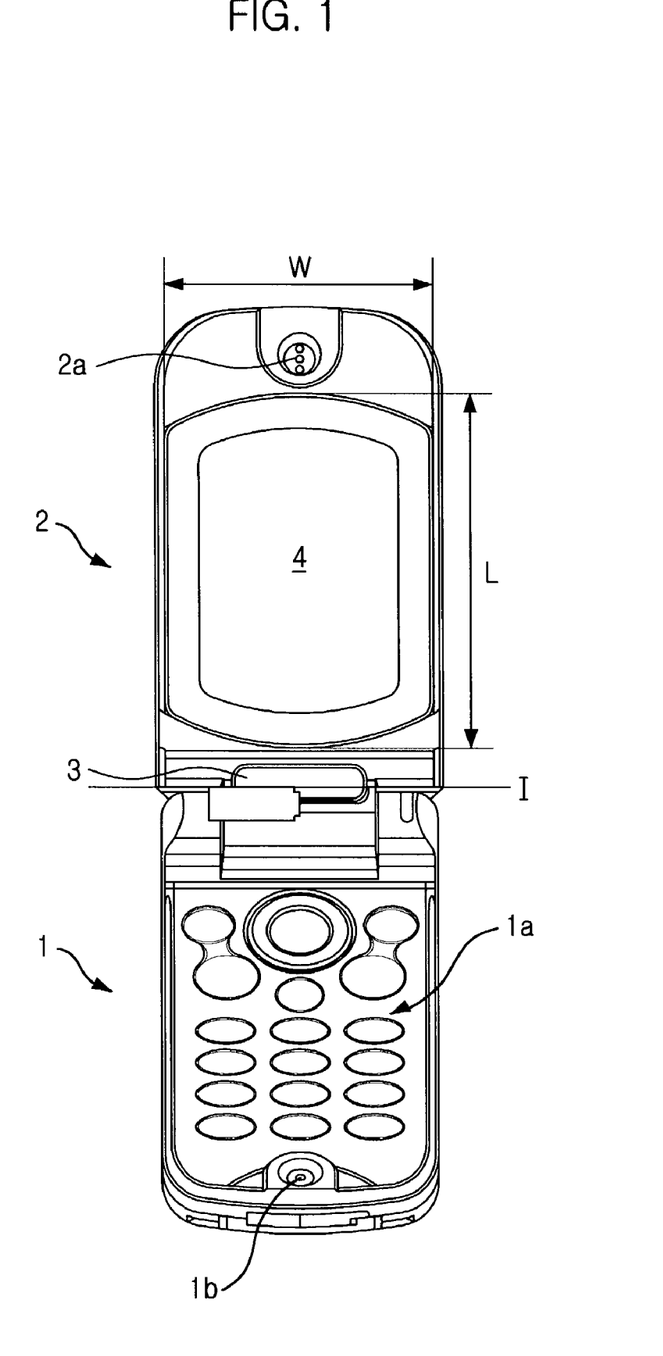
FIG. 1 is a plane view showing an opened state of a mobile terminal with a typical liquid crystal display (LCD) device.

FIG. 1 is a plane view showing an opened state of a foldable mobile terminal with a typical LCD device.

As illustrated in FIG. 1, the typical foldable mobile terminal includes a main body unit 1, a folder unit 2 and a hinge unit 3 used in performing the opening and closing of the folder unit 2 in the main body unit 1. Therefore, the folder unit 2 is opened or closed in the main body unit 1 through its rotation around a rotational axis I of the hinge unit 3.

The main body unit 1 includes a keypad 1a, which has number keys, a power key and function keys, and a microphone 1b allocated at a very bottom portion of the main body unit 1.

The folder unit 2 includes an earpiece which has a speaker 2a and is allocated at a very top portion of the folder unit 2, and a LCD 4 allocated below the earpiece.

The LCD 4 is constructed with an elongated length L compared to a width W thereof in order to enlarge the size of the LCD 4. However, since this format is different from a generally used LCD format, i.e., computer monitor or television and so on, this causes a problem that users feel inconvenience when seeing data or moving pictures displayed on the LCD.

To solve this problem, a conventional mobile terminal is suggested to have an LCD of which a length is longer than a width. Then, the mobile terminal is rotated itself in 90° and shows a 90° rotated display on the LCD through its circuit operation. However, in case that a key input is performed in the 90° rotated mobile terminal, since printed letters of input keys are also shown in 90° rotated, it is inconvenient to use the 90° rotated input keys and erroneous key inputs occur frequently.

SUMMARY OF THE INVENTION

It is, therefore, an object of the present invention to provide a mobile communications terminal that is able to be miniaturized and has a rotational liquid crystal display (LCD) capable of providing a horizontally elongated screen when displaying a lot of data or moving pictures, thereby providing a visually convenient use.

In accordance with an aspect of the present invention, there is provided a mobile communications terminal with a rotational liquid crystal display (LCD) device, wherein the LCD device comprising: an LCD accommodation case for accommodating an LCD therein; a folder body case for enabling the LCD accommodation case to be rotated in a predetermined angle; a shaft member for supporting the rotation of the LCD accommodation case on the folder body case; and a guide unit for guiding the rotation of the LCD accommodation case on the folder body case.

BRIEF DESCRIPTION OF THE DRAWINGS(S)

The above and other objects and features of the present invention will become apparent from the following description of the preferred embodiments given in conjunction with the accompanying drawings, in which.

DETAILED DESCRIPTION OF THE INVENTION

Other objects and aspects of the present invention will become apparent from the following description of preferred embodiments with reference to the accompanying drawings, which is set forth hereinafter.

Figure 2:
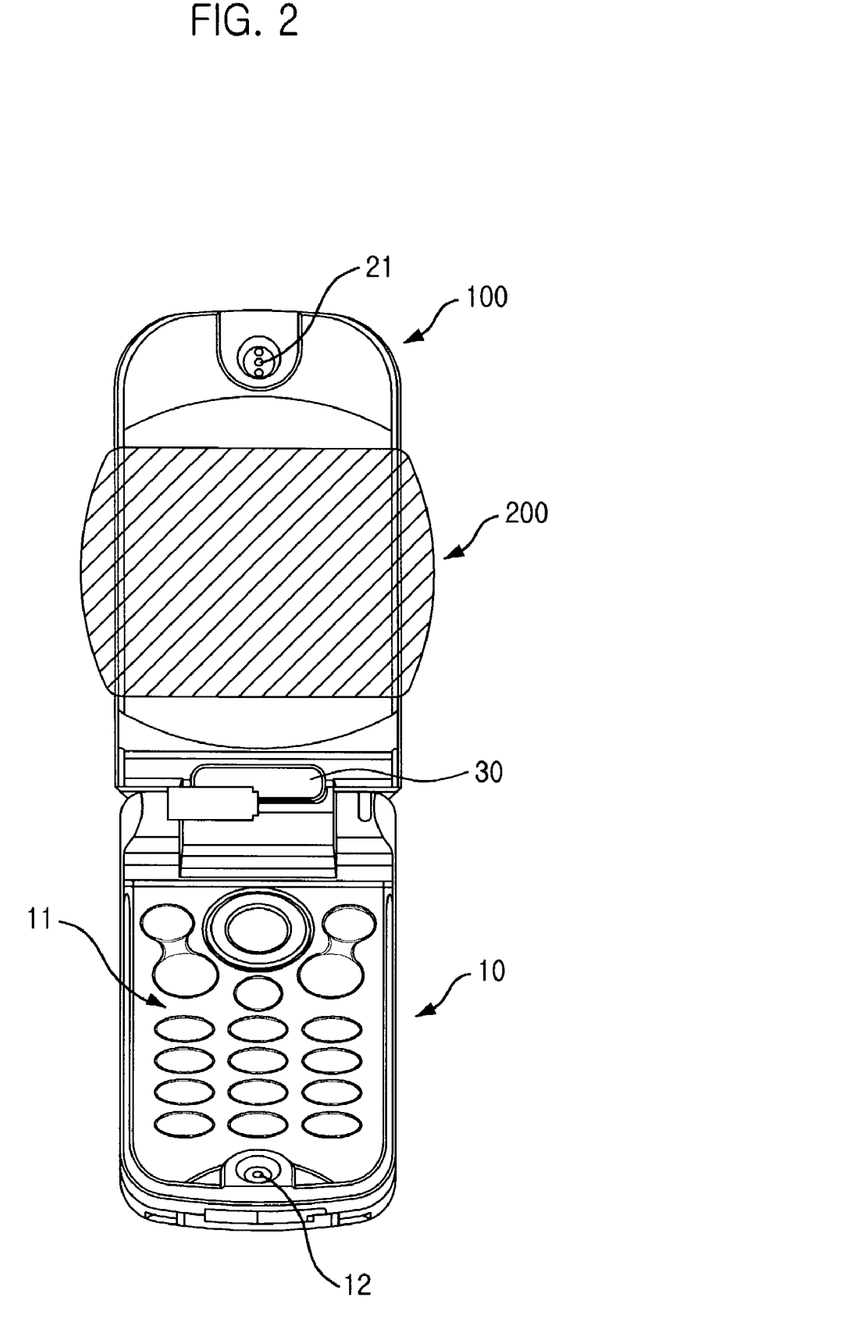
FIG. 2 is a plane view showing an opened state of a mobile terminal with a rotational LCD device in accordance with the present invention.

FIG. 2 is a plane view showing an opened state of a mobile terminal with a rotational liquid crystal display (LCD) device in accordance with the present invention.

As illustrated in FIG. 2, the mobile terminal with the rotational LCD device includes a main body unit 10, a folder unit 100, and a hinge unit 30 used in performing the opening and closing of the folder unit 100 in the main body unit 10.

The main body unit 10 includes a keypad 11, which contains number keys, a power key and function keys, and a microphone 12 allocated in a very bottom portion of the main body unit 10.

The folder unit 100 includes an earpiece which has a speaker (21) and is located at a very upper portion of the folder unit 100, an LCD 200 for displaying data and an LCD rotation unit for allowing the LCD 200 to be rotated preferably in 90° by a user.

Figure 3:
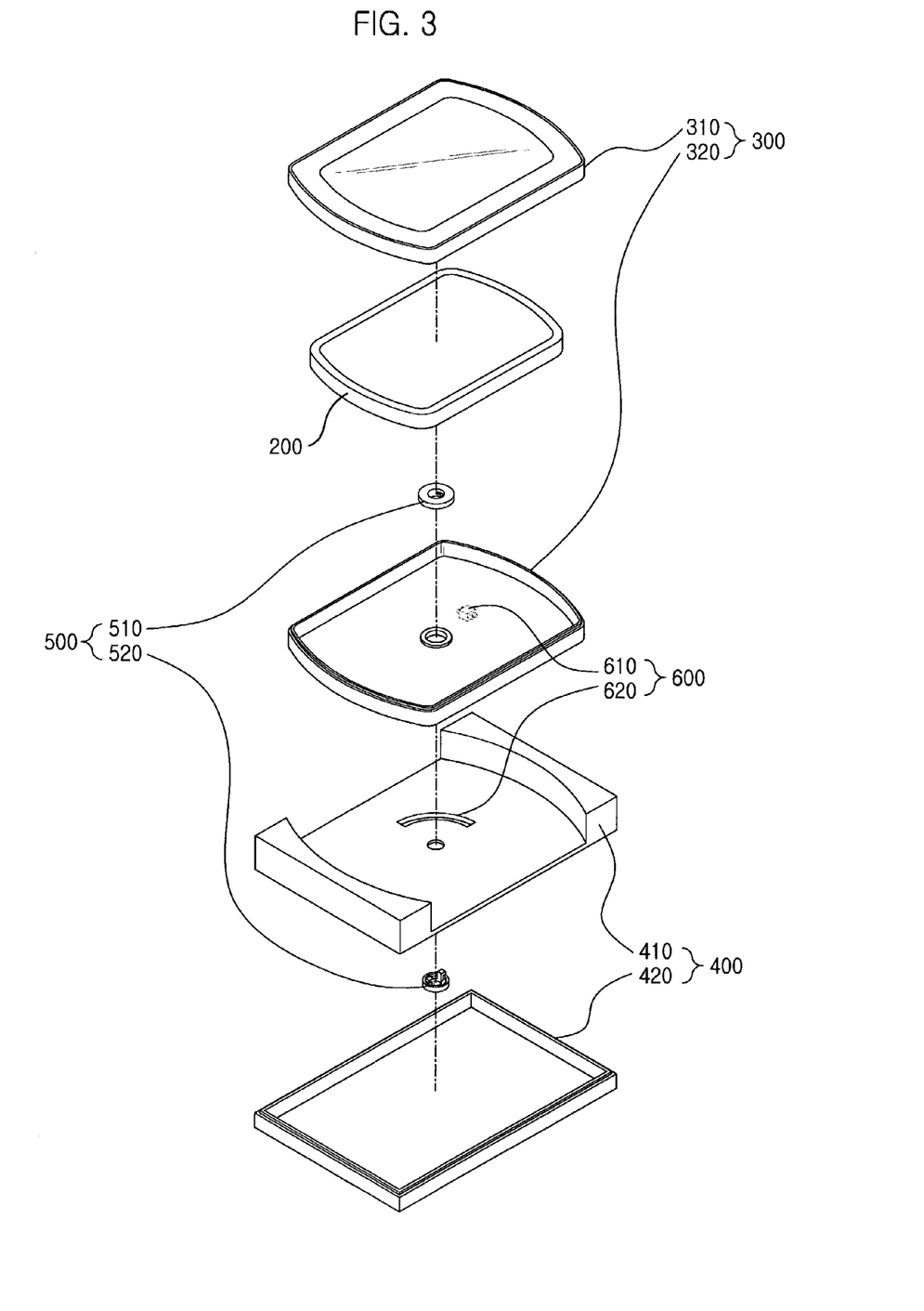
FIG. 3 is a perspective view illustrating a disassembled folder unit including a rotational LCD device in accordance with the present invention.
Figure 4:
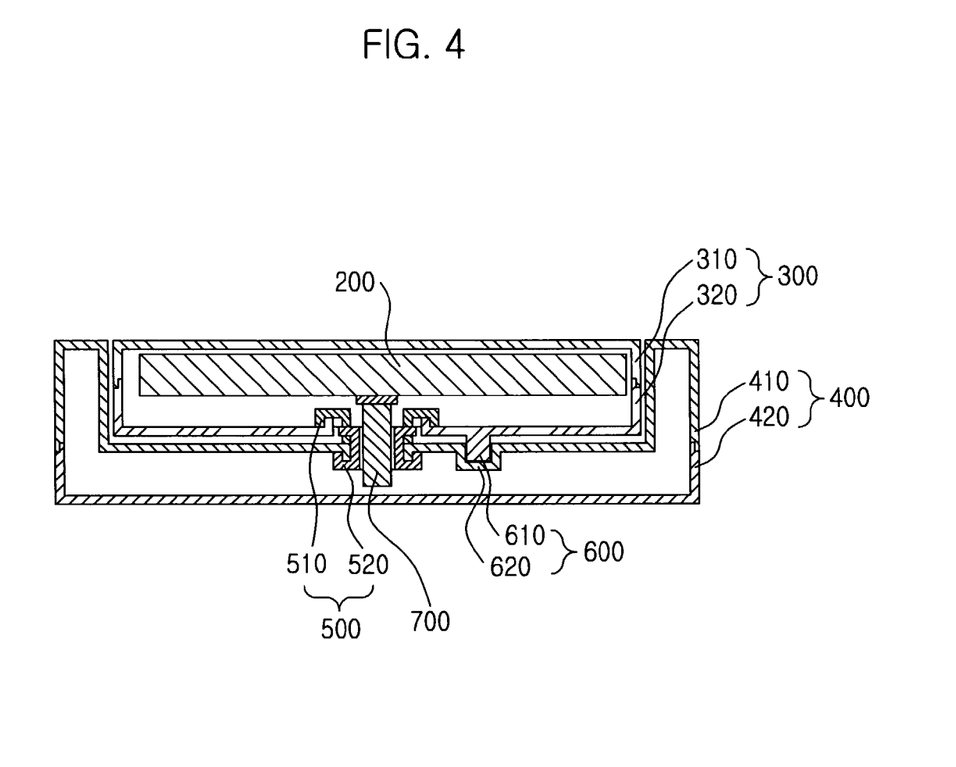
FIG. 4 depicts a cross-sectional view of the folder unit in which the rotational LCD device is assembled in accordance with the present invention.

Referring to FIGS. 3 and 4, components of the LCD rotation unit will be explained in more detail.

FIG. 3 is a perspective view illustrating a disassembled folder unit including a rotational LCD device in accordance with the present invention and FIG. 4 depicts a cross-sectional view of the folder unit in which the rotational LCD device is assembled.

As illustrated in FIGS. 3 and 4, the folder unit 100 with the rotational LCD device includes: an LCD accommodation case 300 for accommodating and fixing the LCD 200 inside; a central shaft for supporting the LCD 200 by being allocated at a center of a lower side of the LCD 200; a folder body case 400 for enabling the LCD accommodation case 300 to be rotated in a predetermined angle around the central shaft; a shaft member 500 for supporting the rotation of the LCD accommodation case 300 on the folder body case 400; a guide unit 600 for guiding the rotation of the LCD accommodation case 300 on the folder body case 400, having a guide protrusion 610 allocated at a lower side of the LCD accommodation case 300 and a guide groove 620 formed at a upper side of the folder body case 400 facing the guide protrusion 610; a position contacting unit for approving a position contacting signal to display data in a horizontal direction on the LCD screen according to the position of the LCD 200; a fixing unit for fixing the LCD accommodation case 300 when the rotation of the LCD accommodation case 300 is completed; and a printed circuit board 700, being flexible and connected to the LCD 200, for displaying keypad input signals of the main body unit 10 on the LCD 200.

With reference to FIGS. 5A, 5B, 6A and 6B, the LCD accommodation case 300 will be described in detail.

Figure 5A:
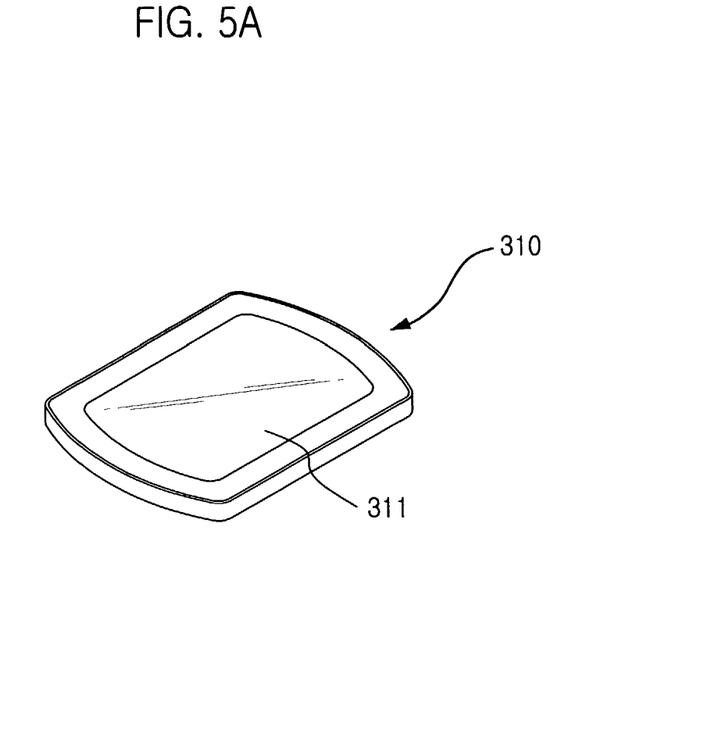
FIGS. 5A and 5B show a perspective plane view and a perspective backside view of a upper portion of an LCD accommodation case in accordance with the present invention, respectively.
Figure 5B:
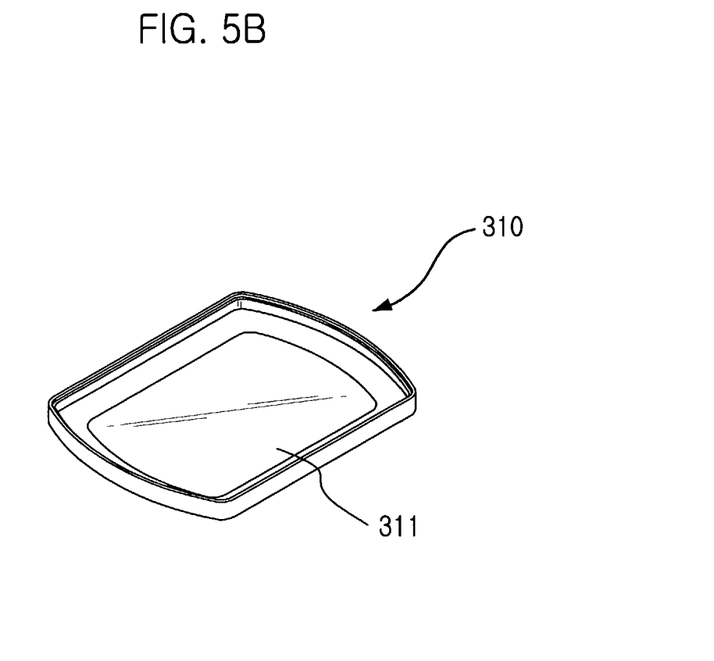
Figure 6A:
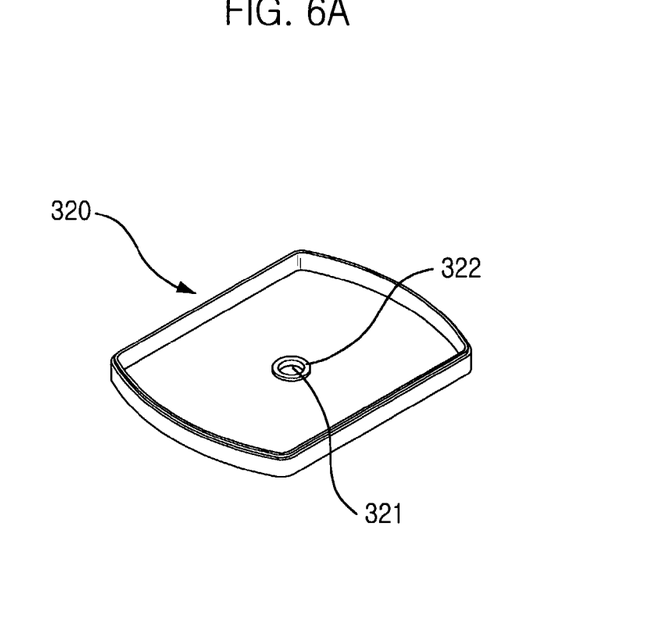
FIGS. 6A and 6B provide a perspective backside view and a perspective plane view of a lower portion of the LCD accommodation case in accordance with the present invention, respectively.
Figure 6B:
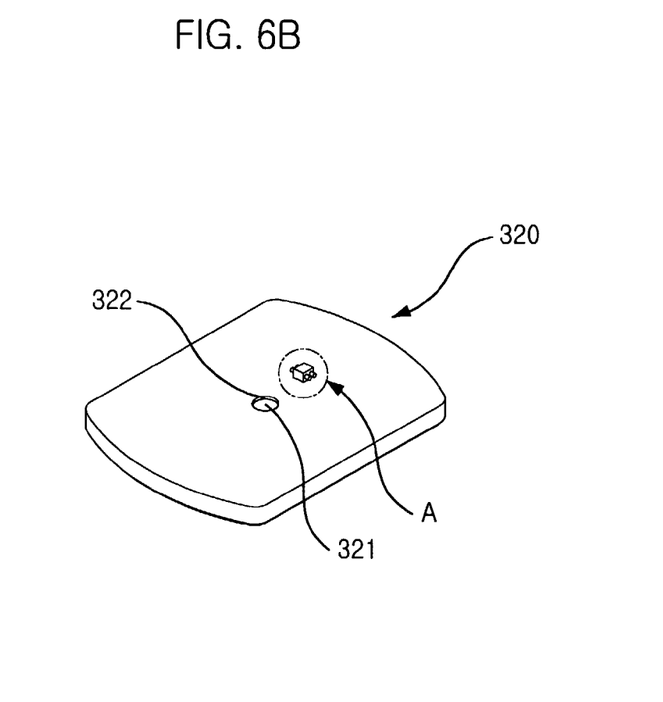

FIGS. 5A and 5B are respectively a plane view and its backside view showing a upper body case of the LCD accommodation case 300 in accordance with the present invention and FIGS. 6A and 6B are respectively a perspective backside view and a plane view depicting a lower body case of the LCD accommodation case in accordance with the present invention.

As illustrated in the drawings, the LCD accommodation case 300 includes a cover 310, i.e., the upper body case, and a container 320, i.e., the lower body case, whose edges are conjoined with the cover 310.

The cover 310 includes a transparent window 311 at a central portion thereof for showing data displayed on the LCD 200 externally through the transparent window 311.

The container 320 includes a hole 321 perforated at a central portion thereof, and through this hole 321, the LCD 200 is connected to the flexible printed circuit board 700. Also, an annular-shaped protrusion unit 322 is formed along a rim of the hole 321 with predetermined protruded thickness and height in one direction of the container 300.

A backside of the container 320 includes some components of the guide unit and the position contacting unit A and these components A will be explained in more detail in the later section.

Figure 7A:
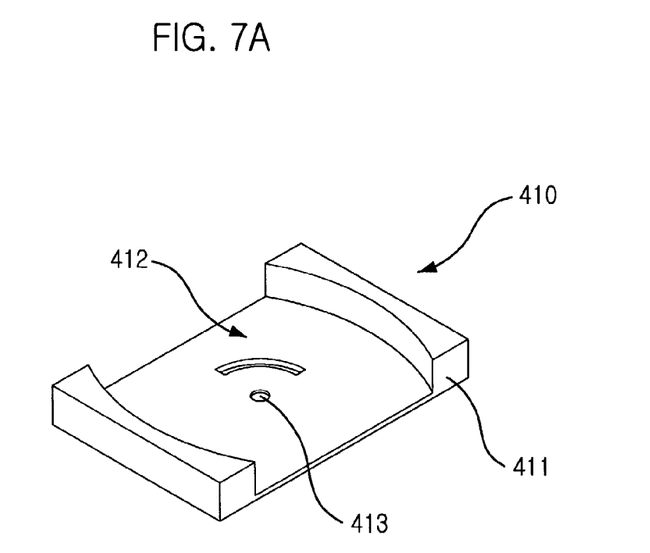
FIGS. 7A to 7C illustrate a perspective plane view, a perspective backside view and a backside view of an upper body case of a folder body case in accordance with the present invention, respectively.
Figure 7B:
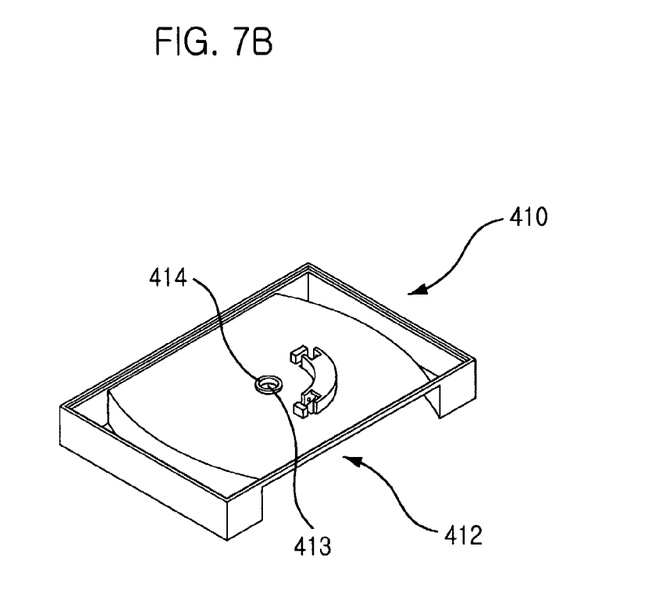
Figure 7C:
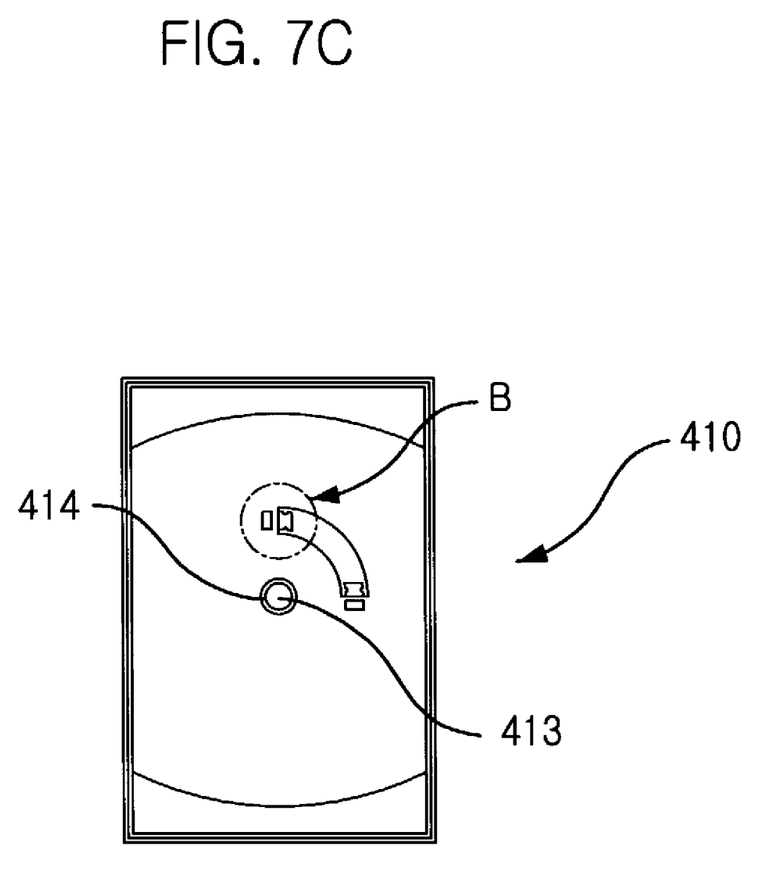
Figure 8:
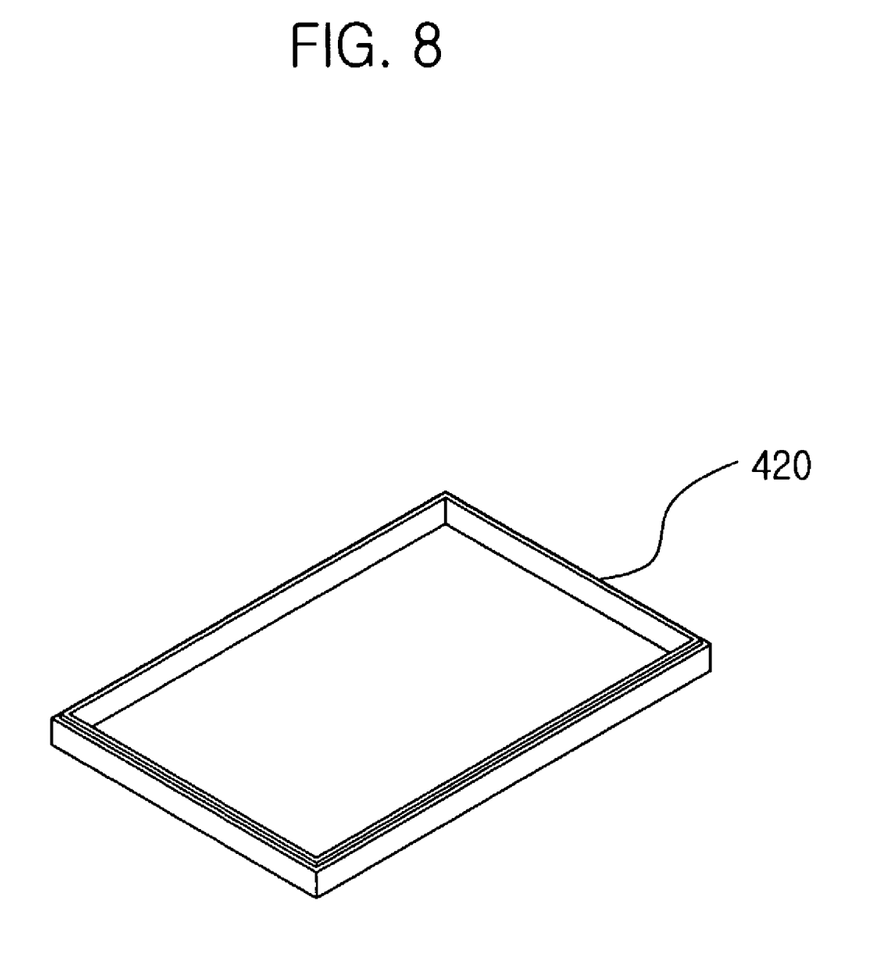
FIG. 8 is a perspective plane view of a lower body case of the folder body case in accordance with the present invention.

Meanwhile, FIGS. 7A to 7C illustrate respectively a perspective plane view, a perspective backside view and a backside view of a upper body case of the folder body case in accordance with the present invention. FIG. 8 is a perspective plane view of a lower body case of the folder body case in accordance with the present invention.

As shown in FIGS. 7A, 7B, 7C and 8, the folder body case 400 includes a upper body case 410 and a lower body case 420 of which edges are conjoined with the upper body case 410.

Referring to FIGS. 7A to 7C, the upper body case 410 includes: a body 411 having a shape of a rectangular parallelepiped whose bottom portion is opened; an accommodation unit 412 for positioning the LCD accommodation case 300 in a caved-in part formed by folding a central part of the body 411 towards a bottom direction; a hole 413 perforated at a center of the accommodation unit 412, through which the flexible printed circuit board 700 is connected to the LCD 200; and an annular-shaped protrusion unit 414 being protruded at a rim of the hole 413 with predetermined height and thickness in one direction of the accommodation unit 412.

In the above case, it is optimal to form the accommodation unit 412 of which a predefined radius is larger than a rotational radius of the LCD accommodation case 300. A part B will be explained in more detail in FIG. 12.

Referring to FIG. 8, the lower body case 420 is used as a folder bottom case for closing the opened side of the body 411 of the upper body case 410.

In the meantime, with reference to FIGS. 9A to 9C and FIGS. 10A and 10B, there are described the shaft member 500 for supporting the rotation of the LCD accommodation case 300 on the folder body case 400.

Figure 9A:
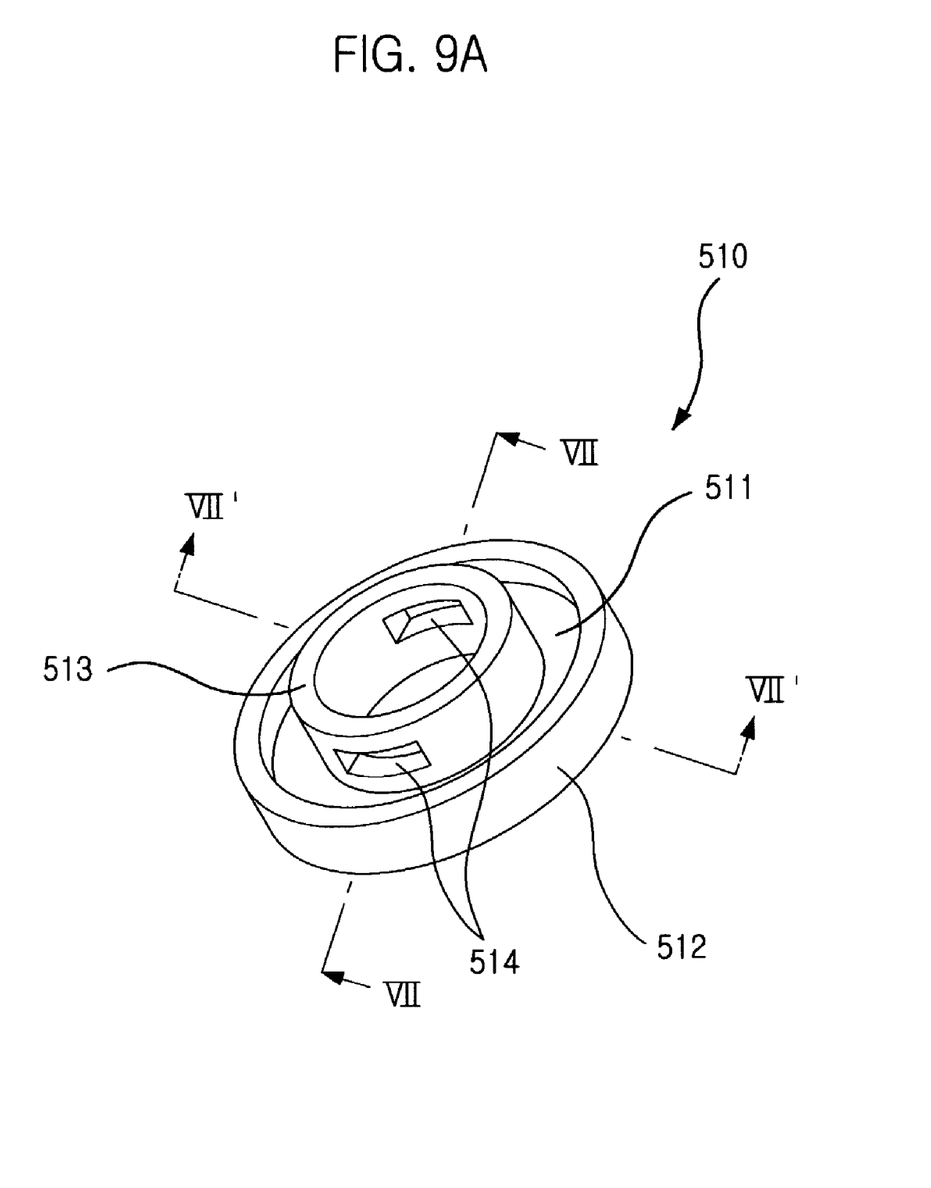
FIG. 9A is a perspective plane view showing an upper shaft of a shaft member of the rotational LCD device in accordance with the present invention.
Figure 9B:
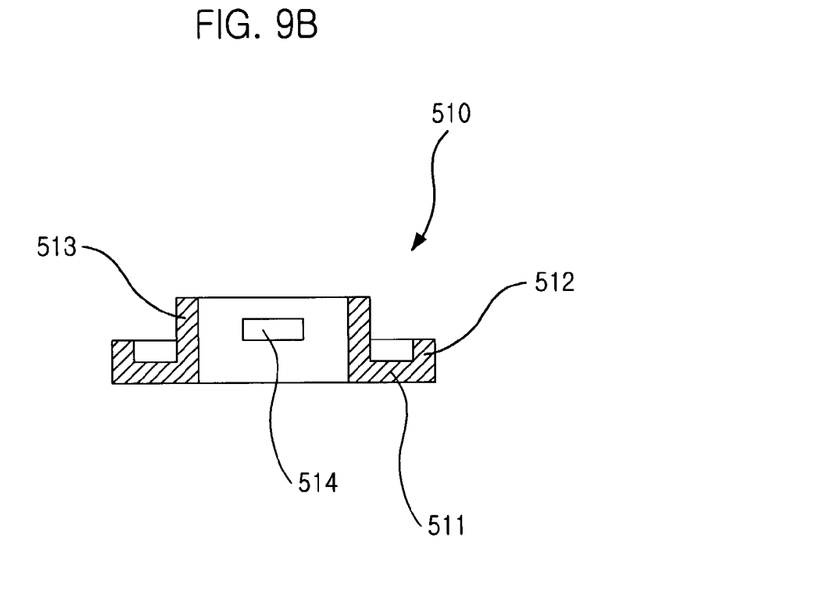
FIG. 9B is a cross-sectional view of a VII—VII line shown in FIG. 9A.
Figure 9C:
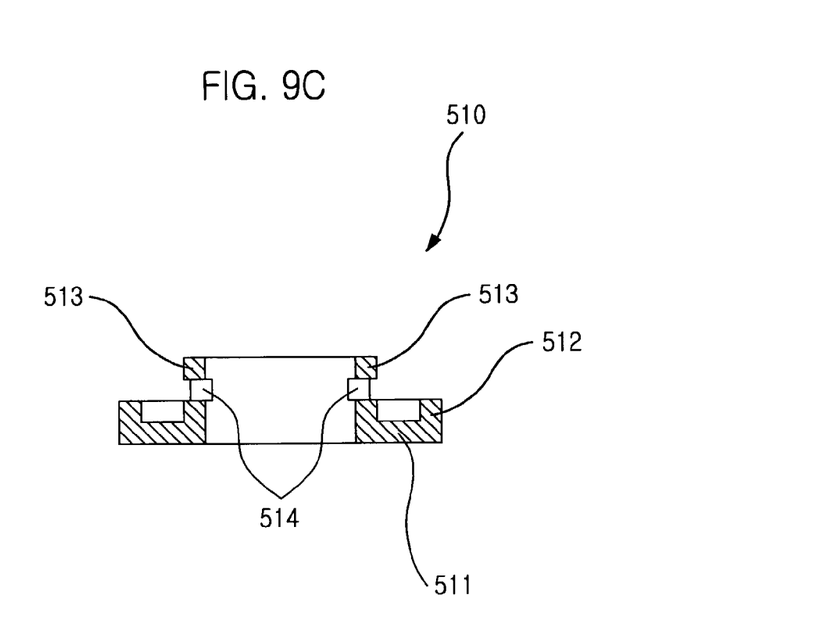
FIG. 9C is a cross-sectional view of a VII'—VII' line shown in FIG. 9A.

FIG. 9A is a perspective plane view of a upper shaft of the shaft member 500 of the rotational LCD device in accordance with the present invention. FIG. 9B is a cross-sectional view of a VII—VII line shown in FIG. 9A. FIG. 9C is a cross-sectional view of a VII'—VII' line shown in FIG. VII and VII' of FIG. 9A respectively meand the cross line of FIG. 9B and FIG. 9C.

Figure 10A:
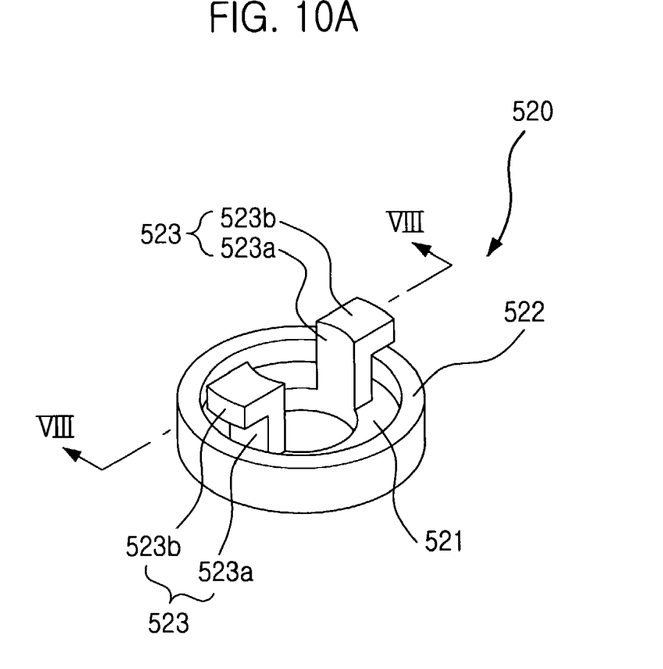
FIG. 10A is a perspective plane view of a lower shaft of the shaft member of the rotational LCD device in accordance with the present invention.
Figure 10B:
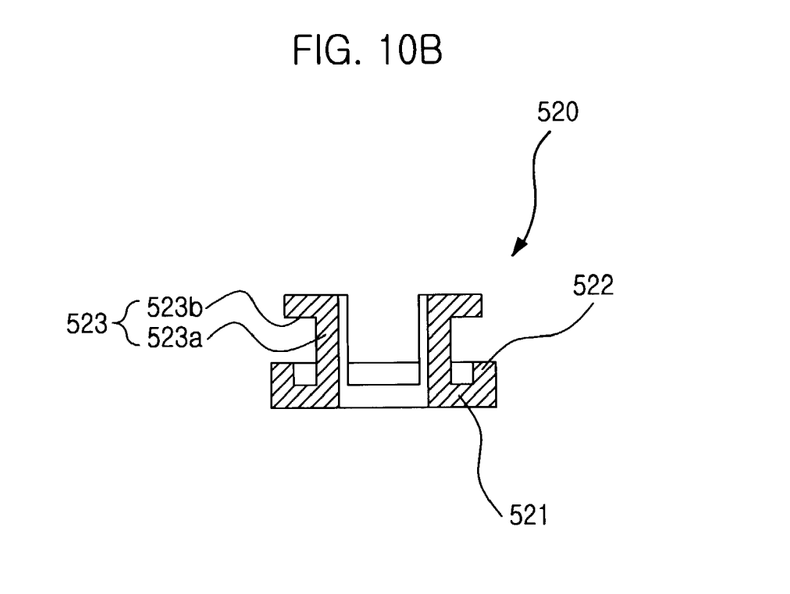
FIG. 10B is a cross-sectional view of a VIII—VIII line shown in FIG. 10A.

FIG. 10A is a perspective plane view of a lower shaft of the shaft member 500 of the rotational LCD device in accordance with the present invention. FIG. 10B is a cross-sectional view of a VIII—VIII line shown in FIG. 10A. VIII of FIG. 10A means the cross line of FIG. 10B.

As illustrated in the drawings, the shaft member 500, which is one component of a liquid crystal display (LCD) device, includes a upper shaft 510 and a lower shaft 520.

Referring to FIGS. 9A to 9C, the upper shaft 510 includes: an annular-shaped ring unit 511 with a predetermined width; a first annular-shaped extension unit 512 being extended in one direction with a predetermined height from an external rim of the annular-shaped ring unit 511; a second annular-shaped extension unit 513 being extended in one direction with a predetermined height from an internal rim of the annular-shaped ring unit 511; and a pair of combining recesses 514 being perforated in a direction along the rim of the second annular-shaped extension unit 513 but facing symmetrically to each other on the rim surface with a predetermined length.

In this case, a diameter of the first annular-shaped extension unit 512 is smaller than that of the hole 321 of the container 320 in the LCD accommodation case 300. Also, the distance between the internal rim surface of the first annular-shaped extension unit 512 and the external rim surface of the second annular-shaped extension unit 513 is set larger than the thickness of the annular-shaped protrusion unit 322 of the container 320 so that the annular-shaped protrusion unit 322 is interjected in between the internal rim surface of the first annular-shaped extension unit 512 and the external rim surface of the second annular-shaped extension unit 513 when the upper shaft 510 is injected to the hole 321 from the upper portion of the container 320.

As illustrated in FIGS. 10A and 10B, the lower shaft 520 includes: an annular-shaped ring unit 521 with a predetermined width; an annular-shaped extension unit 522 being extended with a predetermined height in one direction from an external rim of the annular-shaped ring unit 521; a pair of guide combining projections 523 symmetrically facing to each other, each guide combining projection having a vertical extension unit 523a being extended in one direction from a predetermined section of the internal rim of the annular-shaped ring unit 521 and a horizontal extension unit 523b being folded and horizontally extended at an end portion of the vertical extension unit 523a so as to be inserted into the combing recesses 514 of the upper shaft 510.

In this case, a distance between the internal rim surface of the annular-shaped extension unit 522 and the external rim surface of the guide combining projection 523 is larger than a thickness of the annular-shaped protrusion unit 414 of the upper body case 410 so that the annular-shaped protrusion unit 414 is interjected in between the internal rim surface of the annular-shaped extension unit 522 and the external rim surface of the guide combining projections 523 when the lower shaft 520 is combined at the backside of the upper body case 410 towards the hole 414.

Figure 11:
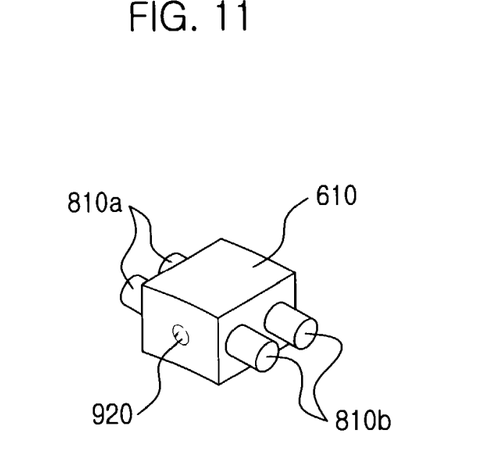
FIG. 11 is an enlarged perspective view illustrating a part A in FIG. 6B.
Figure 12:
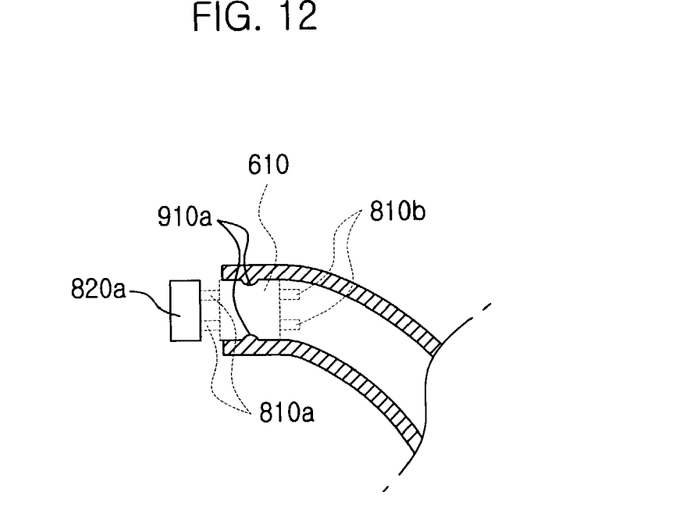
FIG. 12 is an enlarged plane view representing a part B in FIG. 7C.

With reference to FIG. 11 and FIG. 12, it will be described in detail with respect to the guide unit 600 for guiding the rotation of the LCD accommodation case 300 on the folder body case 400, the position determination contacting unit for approving a position contacting signal to display data on a screen in a horizontal direction according to the position of the LCD 200 and the fixing unit for fixing the LCD accommodation case 300 when completing the rotation.

FIG. 11 is an enlarged perspective view of the part A in FIG. 6B. FIG. 12 is an enlarged plane view of the part B in FIG. 7C.

Firstly, the guide unit 600 includes: the guide protrusion 610 being formed with protrusions at the backside of the container 320 in the LCD accommodation case 300; and the guide groove 620 being formed by caving-in in a lower direction of the accommodation unit 412 of the upper body case 420 in order to guide the guide protrusion 610 and being formed in a range of a moving radius of the guide protrusion 610 when the LCD accommodation case 300 is rotated on the folder body case 400.

In this case, it is preferable to form the guide groove 620 in the range of 90°.

The position determination contacting unit includes: a first and a second spring pin 810a and 810b which are placed elastically on a surface towards a moving direction of the guide protrusion 610 that moves along the guide groove 620, and make a circuit connection with the printed circuit board 700; and a contact point 820a, which is placed at each end of the guide groove 620 so that the guide protrusion 610 contacts to the first and the second spring pins 810a and 810b as it moves and makes a circuit connection with the printed circuit board 700.

Meanwhile, the fixing unit includes: a protrusion unit 910a, being protruded roundly from an internal wall surface at each end of the guide groove 620; and a fixing groove 920 shown in FIG. 11, being formed in a round shape on a contact surface of the guide protrusion 610 so that the protrusion unit 910a can make a sliding insertion when the guide protrusion 610 is placed at the end of the guide groove 620.

There is explained an assembling operation of the display rotation device constructed as shown above.

Firstly, the second annular-shaped extension unit 513 of the upper shaft 510 is inserted in the hole 321 of the container 320. At this time, the annular-shaped protrusion unit 322 of the container 320 is placed in between the first annular-shaped extension unit 512 and the second annular-shaped extension unit 513.

The container 320 combined with the upper shaft 510 is placed at the accommodation unit 412 of the upper body case 410, and then the lower shaft 520 is inserted through the hole 413 of the upper body case 410 so that the horizontal extension unit 523b of each guide combining projection 523 in the lower shaft 520 is inserted and fixed at each combining recess 514 of the upper shaft 510.

In the above state of assemblage, the LCD 200 is accommodated in the container 320. Then, the upper side of the container 320 is combined with the cover 310 and the lower body case 420 is combined with the opening side of the upper body case 410.

In the above, the LCD 200 makes a circuit connection with the flexible printed circuit board 700 through the hole 413 of the upper body case 410 and the hole 321 of the container 320. Also, the spring pins 810a and 810b placed on the backside of the upper body case 410 and the contact point 820a also make circuit connections with the printed circuit board 700.

An operation of the mobile terminal with the above rotational LCD device will be described in detail.

Mobile terminal users usually use the LCD as shown in FIG. 1. However, when they need to use the LCD as like a computer or television monitor for seeing moving pictures or a lot of data, the users rotate the LCD accommodation case 300 along the rotation axis of the shaft member 600 as shown in FIG. 2.

As the LCD accommodation case 300 rotates, the guide protrusion 610 formed at the backside of the container 320 of the LCD accommodation case 300 moves along the guide groove 620 of the upper body case 410.

As depicted in FIG. 2, when the LCD accommodation case 300 completes the rotation, the protrusion unit 910a of the guide groove 620 are inserted by means of sliding to the fixing groove 920 of the guide protrusion 610, so that the LCD accommodation case 300 becomes firmly fixed.

Simultaneous to the above operation, the spring pin 810a of the guide protrusion 610 is contacted to the contact point 820a that faces symmetrically to the spring pin 810a, so that data displayed vertically on the screen are shown horizontally on the screen.

In case of returning the LCD to the original position in FIG. 1, the rotation of the LCD is rotated in counter angle of 90°. At this time, the protrusion unit 910a of the guide groove 620 is inserted by means of sliding to the fixing groove 920 of the guide protrusion 610, so that the LCD accommodation case 300 becomes firmly fixed.

Simultaneously, the spring pin 810b of the guide protrusion 610 is contacted to the contact point 820b that faces symmetrically to the spring pin 810b so as to convert the horizontal data display to the vertical data display.

At this time, the flexible printed circuit board 700 connected to a base portion of the LCD is assembled through an empty space inside of the shaft member 500. Thus, even the LCD accommodation case 300 is rotated, it is twisted very flexibly without influencing its intensity.

As can be seen from above, by performing the embodiment in accordance with the present invention, there are provided advantages that it is possible to establish an LCD capable of rotating so to make the width of the LCD wider without changing the actual size of mobile terminal, thereby seeing conveniently moving pictures or data enormously transferred.

While the present invention has been described with respect to certain preferred embodiments, it will be apparent to those skilled in the art that various changes and modifications may be made without departing from the scope of the invention as defined in the following claims.

What is claimed is:

1. A mobile communications terminal with a rotational liquid crystal display (LCD) device, wherein the LCD device comprising:
    an LCD accommodation case for accommodating an LCD therein;
    a folder body case for enabling the LCD accommodation case to be rotated in a predetermined angle;
    a shaft member for supporting the rotation of the LCD accommodation case on the folder body case; and
    a guide unit for guiding the rotation of the LCD accommodation case on the folder body case
    wherein the shaft member includes:
        a upper shaft having:
            a first annular-shaped ring unit;
            a first annular-shaped extension unit being extended in one direction with a predetermined height from an external rim of the annular-shaped ring unit;
            a second annular-shaped extension unit being extended in one direction with a preset height from an internal rim of the annular-shaped ring unit; and
            a pair of combining recesses being perforated with a certain length in a direction along a rim surface of the second annular-shaped extension unit and facing symmetrically to each other; and
        a lower shaft having:
            a second annular-shaped ring unit;
            a third annular-shaped extension unit being extended with a predefined height in one direction from an external rim of the annular-shaped ring unit; and
            a pair of combining projections symmetrically facing to each other, each combining projection having a vertical extension unit being extended in one direction from a predetermined section of an internal rim of the second annular-shaped ring unit and a horizontal extension unit being folded and horizontally extended at an end portion of the vertical extension unit.

2. The mobile communications terminal as recited in claim 1, wherein the LCD accommodation case includes:
    a cover having a transparent window at a central portion thereof for showing data displayed on the LCD externally through the transparent window; and
    a container having:
        a hole perforated at a central portion of the container, through which the LCD is connected to a printed circuit board; and
        an annular-shaped protrusion formed along a rim of said hole.

3. The mobile communications terminal as recited in claim 2, wherein the folder body case includes:
    a upper body case having:
        a body having a shape of a rectangular parallelepiped whose bottom portion is opened;
        an accommodation unit for positioning the LCD accommodation case in a caved-in part formed by folding a central part of the body towards a bottom direction of the body;
        a hole perforated at a center of the accommodation unit, through which the LCD is connected to the printed circuit board; and
        an annular-shaped protrusion unit being protruded in a rim of said hole with predetermined height and thickness in one direction of the accommodation unit; and
    a lower body case whose edges are conjoined with the opened bottom of the upper body case.

4. The mobile communications terminal as recited in claim 3, wherein the upper shaft and the lower shaft are inserted to face each other through the hole of the container of the LCD accommodation case and that of the upper body case of the folder body case, respectively, so that the pair of the combining projections of the lower shaft are inserted into the combining recesses of the upper shaft.

5. The mobile communications terminal as recited in claim 4, wherein a diameter of the second annular-shaped extension unit of the upper shaft is smaller than that of the hole of the container, and a distance between an internal rim surface of the first annular-shaped extension unit and an external rim surface of the second annular-shaped extension unit is larger than a thickness of the annular-shaped protrusion unit of the container.

6. The mobile communications terminal as recited in claim 4, wherein a distance between an internal rim surface of the third annular-shaped extension unit of the lower shaft and an external rim surface of the combining projection is larger than a thickness of the annular-shaped protrusion unit of the upper body case.

7. The mobile communications terminal as recited in claim 1, wherein the guide unit includes:
    a guide protrusion being formed with protrusions at a backside of the LCD accommodation case; and
    a guide groove being formed by caving-in in a lower direction of an upper case of the folder body case within a range of a moving radius of the guide protrusion as the LCD accommodation case is rotating.

8. The mobile communications terminal as recited in claim 7, wherein the guide groove is formed within an angle of 90°.

9. The mobile communications terminal as recited in claim 7, wherein the guide unit further includes a position contacting unit for approving a position contacting signal to display data on a screen of the LCD in a uniform direction according to the position of the LCD.

10. The mobile communications terminal as recited in claim 9, wherein the position contacting unit includes:
    spring pins being elastically allocated on a surface towards a moving direction of the guide protrusion that moves along the guide groove to make a circuit connection with a printed circuit board; and contact points being mounted at each end of the guide groove to face symmetrically to each other and contacting to the spring pins as the movement of the guide protrusion is completed, for making a circuit connection with the printed circuit board.

11. The mobile communications terminal as recited in claim 7, wherein the guide unit further includes a fixing unit for fixing the LCD at a place where the rotation of the LCD accommodation case is completed.

12. The mobile communications terminal as recited in claim 11, wherein the fixing unit has:

protrusion units being protruded from an internal wall surface at each end of the guide groove to face symmetrically to each other; and a fixing groove being formed on contact surfaces of the guide protrusion in a direction of facing symmetrically to each other so that the protrusion units are inserted when the guide protrusion is positioned at an end of the guide groove.

13. The mobile communications terminal as recited in claim 12, wherein the protrusion units are formed in a round shape.

* * * * *